(12) United States Patent
Teder

(10) Patent No.: US 8,441,221 B2
(45) Date of Patent: May 14, 2013

(54) WINDSHIELD WIPER CONTROL SYSTEM

(75) Inventor: Rein S. Teder, Bloomington, MN (US)

(73) Assignee: Hydreon Corporation, Eden Prairie, MN (US)

( * ) Notice: Subject to any disclaimer, the term of this patent is extended or adjusted under 35 U.S.C. 154(b) by 0 days.

(21) Appl. No.: 12/998,689

(22) PCT Filed: Nov. 19, 2009

(86) PCT No.: PCT/US2009/006181
§ 371 (c)(1),
(2), (4) Date: May 19, 2011

(87) PCT Pub. No.: WO2010/065062
PCT Pub. Date: Jun. 10, 2010

(65) Prior Publication Data
US 2011/0221372 A1     Sep. 15, 2011

Related U.S. Application Data

(60) Provisional application No. 61/200,649, filed on Dec. 2, 2008.

(51) Int. Cl.
*G05D 1/00* (2006.01)

(52) U.S. Cl.
USPC ............................ 318/643; 318/483; 318/70

(58) Field of Classification Search .................... 318/66, 318/68, 69, 70, 483, 638, 643
See application file for complete search history.

(56) References Cited

U.S. PATENT DOCUMENTS

| 5,059,877 | A | | 10/1991 | Teder | |
|---|---|---|---|---|---|
| 5,216,341 | A | | 6/1993 | Nomura et al. | |
| 5,239,244 | A | | 8/1993 | Teder | |
| 5,708,242 | A | | 1/1998 | Uchiyama | |
| 5,780,719 | A | * | 7/1998 | VanDam | 73/29.01 |
| 5,898,183 | A | | 4/1999 | Teder | |
| 6,002,229 | A | * | 12/1999 | Pientka et al. | 318/483 |

FOREIGN PATENT DOCUMENTS

JP             3-128748 A         5/1991

* cited by examiner

*Primary Examiner* — Bentsu Ro
*Assistant Examiner* — Iftekhar Mustafa

(57) ABSTRACT

The present invention relates to a low-cost windshield wiper control system which can be readily incorporated into existing vehicle systems, particularly into an operator-accessible windshield wiper control unit assembly (100). The windshield wiper control assembly (100) is selectively operable as an intermittent wiper control system, or as a rain sensing windshield wiper control system without the need for microprocessors or multiplex circuitry.

3 Claims, 2 Drawing Sheets

WINDSHIELD WIPER CONTROL SYSTEM

RELATED APPLICATIONS

This application, which is a national phase filing under 35 USC 371 of PCT international application No. PCT/US2009/006181 filed Nov. 19, 2009, pending as of the filing of the present application, claims the benefit of and priority to provisional application No. 61/200,649 filed Dec. 2, 2008.

BACKGROUND OF THE INVENTION

The present invention relates to a windshield wiper control system for a vehicle. More particularly, the present invention relates to a low-cost windshield wiper control system which may be configured in a plurality of ways.

In recent years, it has been increasingly common for motor vehicles to incorporate rain sensing wiper control systems that adjust the speed of the wipers in response to the accumulation of water on the outside surface of the windshield. This is especially true of luxury motor vehicles. Most commonly, these systems employ an optical rain sensor to detect the presence of water on the windshield glass. The presence of rain or snow on the outside surface of the windshield disrupts light beams emitted by the optical sensor, and the rain sensor detects such disruptions to determine an appropriate speed for the vehicle wipers. A practical implementation of such a system was taught by Teder in U.S. Pat. No. 5,059,877. The rain sensor taught in U.S. Pat. No. 5,898,183 to Teder shows a rain sensor may be made in a very compact and inexpensive form.

The sensor, however, represents only part of a complete rain sensing windshield wiper control system. The sensor must be operatively connected to a windshield wiper motor which, in turn, is connected to a wiper linkage that runs the wipers to keep the windshield clear of water. In most modern rain sensing wiper systems, communication from the sensor is typically done in digital form over a multiplexed system such as a Local Interconnect Network ("LIN") or Controller Area Network ("CAN") bus. Indeed, the trend in most vehicle wiring has been towards more use of such multiplexed systems for a variety of purposes. These allow for greater system integration and intercommunication, improved system diagnostics, as well as other advantages. Many luxury vehicles use these multiplexed systems in almost all systems and sub-systems. It is no surprise, therefore, that almost all currently produced factory-installed rain sensing windshield wiper systems are built around the CAN and LIN bus architectures.

With all the advantages of multiplexed systems noted above, a critical disadvantage is the cost of such systems. Cost, typically is the single biggest driver as to whether or not a particular convenience feature is included as a standard feature or offered as an option on any particular vehicle. As result, there are currently no low-cost cars sold in North America that offer rain sensing windshield wipers, even as part of an option package.

One lower cost alternative to a LIN or CAN based system is to put an interface module between the wiper motor and the switch, for example as taught by Teder in U.S. Pat. No. 5,239,244. An interface module may include relays that directly supply current to the wiper motor. A similar device is sold by Opto-Electronic Design under the trademark "Rain Tracker." This approach is markedly less expensive than a CAN approach, but the interface module still has the expense of a plastic housing, relays, etc. Also, there is reluctance on the part of the vehicle manufacturer to proliferate ever more small control modules under the dashboard.

Alternatively, manufacturers may integrate a computer-based rain sensor interface, with or without CAN communications, directly into the wiper motor housing. This has been done, for example, in many production General Motors vehicles sold in the mid-1990's with rain sensing windshield wiper control systems. The control circuit was enclosed in a suitable weatherproof enclosure for the electronic circuitry, as the under-hood environment of the wiper motor can be quite harsh. The electronic circuitry must thus also be designed to withstand an extended temperature range. Also, the connection to the sensor must be made through the vehicle firewall. This approach works well, but is not low cost.

It is a common configuration in currently produced low-cost cars to include a simple intermittent wiper control system built into the windshield wiper operation switch instead of the wiper motor. The general trend has been away from such systems, partly because the space for the wiper switch is crowded by the need for a large airbag assembly built into the steering wheel hub. One such system is taught by Uchiayama in U.S. Pat. No. 5,708,242. This system does not accept a rain sensor input, however, and the physical size limits imposed upon the wiper switch would make it difficult to increase the complexity of the system.

The trend in vehicle wiring systems and rain sensing wiper control systems is thus towards greater complexity, and this will likely evolve over time to become affordable. Today, however, in order to provide the convenience of rain sensing wipers for low-cost cars and vehicles sold in emerging markets, a truly simple and inexpensive complete rain sensing wiper system is needed.

SUMMARY OF THE INVENTION

The present invention is directed to a low-cost windshield wiper control system which is readily incorporated into existing vehicle systems and is, in particular, operatively connected to/integrated into the operator-accessible windshield wiper control unit assembly, and is selectively operable as a conventional intermittent windshield wiper control system, or as a rain sensing windshield wiper control system. When a rain sensor is part of the windshield wiper control system, the rain sensor is capable of producing varying control voltage outputs, each of which has an associated rain sensor output electrical resistance. Preferably, integrated into the control circuit of the operator accessible windshield wiper control unit, the present wiper control system has an intermittent operation mode wipe timing network which has a timing network resistance. The resistance of the intermittent operation mode wipe timing network is high relative to the rain sensor output resistance so that when a rain sensor is present, and all required elements are operatively connected, the present windshield wiper control system operates in a rain sensing mode, but when the rain sensor is not operatively connected, the high resistance value of the intermittent operation mode timing network causes the present windshield wiper control system to operate as a conventional intermittent wiper system. Such variable mode windshield wiper control operation is accomplished without the need for expensive integrated circuitry and/or micro-processors.

BRIEF DESCRIPTION OF THE DRAWINGS

The above, as well as other advantages of the present invention will become readily apparent to those skilled in the art from the following detailed description when considered in light of the accompanying drawings in which.

DETAILED DESCRIPTION OF THE INVENTION

Figure 1:
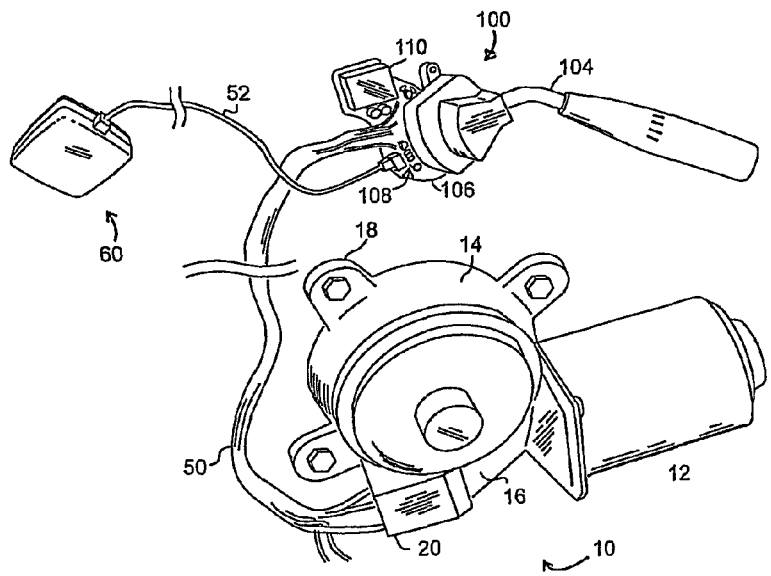
FIG. 1 shows an embodiment of the rain sensing wiper control system according to the present invention, in perspective view.

A preferred embodiment of the present windshield wiper control system of the invention is shown in FIG. 1. The major components of the system comprise a wiper driver motor assembly 10 with integrated cam assembly, an operator accessible windshield wiper control unit 100, and a rain sensor assembly 60. Wiper driver motor assembly 10 is connected to control unit assembly 100 with a wiring harness 50, which also provides power and ground to the system from a vehicle in which the wiper control system is installed. A sensor cable 52 connects the control unit assembly 100 to rain sensor 60, which is mounted on a windshield (not shown).

Wiper driver motor assembly 10 is of a conventional type, and is the kind most commonly used in motor cars. It is comprised of a motor 12, gear drive 14 for driving a wiper arm linkage, and mechanically driven cam/switch 16 for sensing a wiper home position. Cam 16 and gear drive 14 are enclosed in a waterproof assembly 18, with electrical connections 20 provided. A schematic for wiper driver motor assembly 10 is included in an overall system schematic circuit diagram presented in FIG. 2. Cam 16 is disposed to ground a cam output 22 when the wipers are in a home position, and provide 12V electrical power (alternatively called B+) when the wipers are in clearing operation on the windshield, away from a home or rest position. The purpose of cam 16 is to return the wipers to the home position at the end of each wipe cycle.

A number of wires connect to wiper motor assembly 10 as well as to the vehicle to form wiring harness 50. The wires include slow winding wire 24, fast winding wire 26, power B+, ground 28, and cam output wire 22. Optionally, a window wash wire 32 connects a window wash motor 30 to control unit assembly 100. Thus, there are preferably only six wires in harness 50, and the distance between wiper motor assembly 10 and switch assembly 100 is typically short in a small car. This keeps the wiring harness simple and inexpensive.

Wiring harness 50 connects to control unit assembly 100, which is an integrated switch/controller combination. The control unit assembly 100 includes an electrical switch 102 comprising a set of electrical contacts arranged in a conventional slide switch style of contact arrangement, operatively connected to a control arm 104. Switch 102 may assume each of 4 positions: OFF, RS/INT, SLOW, and FAST. RS/INT means "Rain Sensor or Intermittent Mode." Control unit assembly 100 includes a printed circuit board 106. Electronic control circuitry 108 is disposed upon circuit board 106. The contacts of switch 102 are integrated into circuit board 106 using rivets in a conventional manner. The single circuit board 106 thus interconnects the circuitry, supports the electrical switch 102 contacts, and provides overall mechanical structure to the control unit assembly 100. Plastic covers for the circuitry (not shown) may protect the circuitry from mechanical damage, but there is no need for a weatherproof enclosure, as switch 102 is deployed in the passenger compartment of the vehicle.

An important component of control circuitry 108 of the control unit assembly 100 is the slow relay 110 to engage the slow wiper motor winding 24. Relay 110 is shown mechanically in FIG. 1, and schematically in FIG. 2. An electrical input analysis device, for example, a Darlington-type driver transistor 112 is utilized to activate slow relay 110. A sensor connector 114 is connected to transistor 112 via resistors 116 and 118. Sensor connector 114 connects to power B+, ground 28, and a sensor output S. A long time constant, intermittent RC network 120 comprised of resistors 122 and 124, as well as capacitor 126, connects cam output wire-to-sensor output S. RC network 120 has a high resistance, so resistor 122 has a high resistance value. For example, resistor 122 may be ≧68K ohms, and capacitor 126 may be about 47 microfarads. A blocking diode 128 is disposed to prevent the network 120 from sending negative voltages to connection S, which could harm electrical input analysis device 112. A diode, for example, a zener-type diode 130, prevents inductive voltage spikes generated in slow relay 110 from reaching levels that could damage electrical input analysis device 112.

Figure 2:
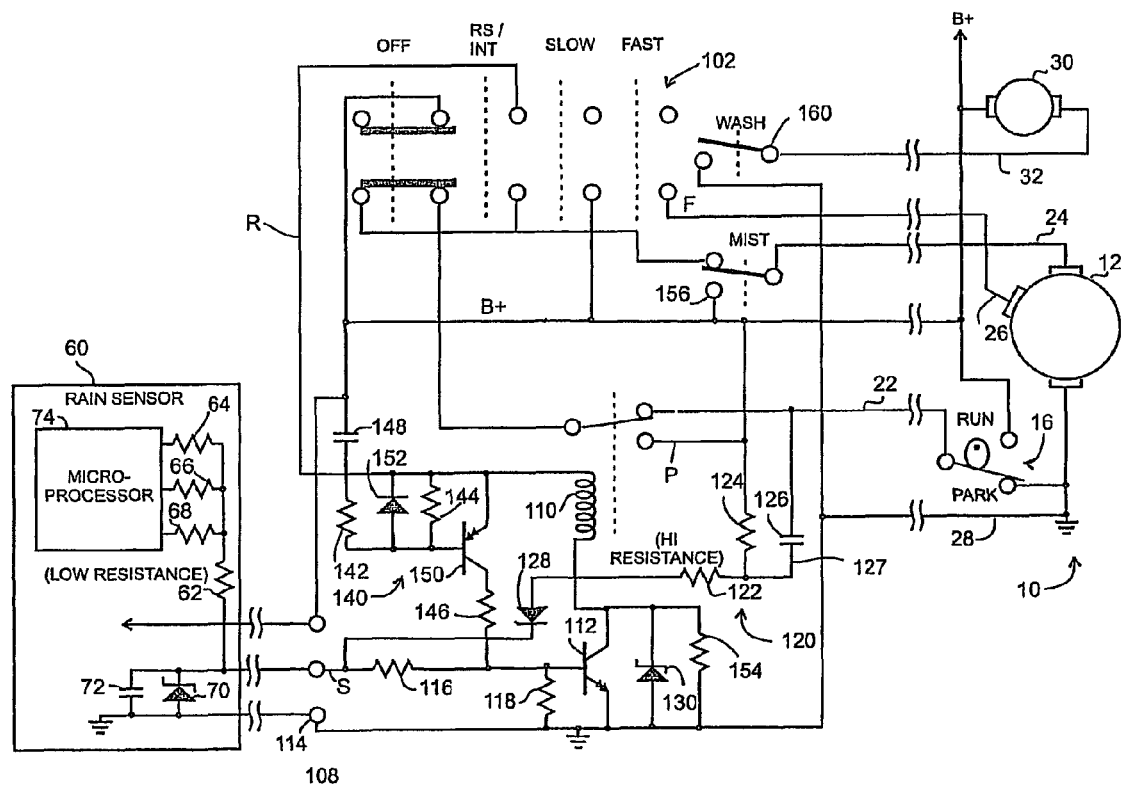
FIG. 2 is a schematic diagram of a preferred control circuit for the rain sensing wiper control system according to the invention.

Control circuitry 108 additionally includes a monostable circuit 140, shown in FIG. 2. Monostable circuit 140 is comprised of resistors 142, 144, and 146, capacitor 148, transistor 150, as well as diode 152. Monostable circuit 140 is configured so as to generate a current pulse, preferably a single current, pulse, through resistor 146 when electrical switch 102 is first switched to the RS/INT position. As will be explained in detail hereafter, monostable circuit 140 does not provide any such pulse if power is applied to switch 102 with the switch already in the off position. Optionally, a MIST switch 156 may be deployed to provide momentary power to wiper motor 12 should the driver pull wiper control arm 104 towards himself or herself. A WASH switch 160 is deployed to engage a wash motor 30. As an additional option, monostable extend wash circuitry (not shown) may be added to provide for a few follow up wipes in the event of activation of the wash circuit. Such wash circuitry is generally not needed, however, as the rain sensor will detect washer fluid sprayed at the windshield, and provide follow up wipes. This reduces or eliminates the need for wash circuitry.

Operation of several embodiments of the windshield wiper control system of the present invention will now be described. The present wiper control system is designed so that the vehicle manufacturer may install the system in a vehicle in two configurations: conventional intermittent or rain sensing. The intermittent system is identical to the rain sensing system, except that it lacks rain sensor 60 and sensor cable 52. Thus, the vehicle manufacturer enjoys the low cost of commonality of most components.

When deployed as an intermittent system, and when switch 102 is in the OFF position, the wiper motor cam circuitry 16 returns the wipers to a home position at the base of the windshield. To accomplish this, if the wipers are not already home, cam 16 provides B+ to the cam wire 22. This power flows through the normally closed contact of slow relay 110, through switch 102, and to the slow winding 24 of wiper motor 12. The motor thus spins and moves the wipers by way of the linkage. When the wipers reach the home position, cam 16 grounds cam output 22. This quickly stops the wiper motor 12. For manual slow operation, slow winding connection 24 is connected to B+ through switch 102. MIST switch 156 provides for a momentary operation of the same function. Manual fast is similar, providing B+ to fast winding connection 26 by way of switch 102. In fast operation, slow winding 24 is disconnected from other electrical connection via switch 102 to prevent a higher voltage present through the generator effect of the motor from being shorted to B+, which would otherwise cause unnecessary wear on the wiper motor. Slow relay 110 is powered through switch 102 by conductor R, which assumes a voltage of B+ only when the switch is in the RS/INT position.

When switch 102 is moved from off to intermittent, monostable circuit 140 provides a pulse of about one second to the base of transistor 112, engaging slow relay 110. It does this by discharging capacitor 148, which was charged when the switch was in the off position, through transistor 150. The normally open contact of slow relay 110 provides B+, by way of switch 102, to slow winding 24, and the motor spins. At the conclusion of this pulse, cam circuit 16 returns the wipers to the home position in the manner described above. If the system is powered up with switch 102 already in the off position, then 148 was never charged, and there is no monostable pulse. This is so that the system does not deliver a wipe on power-up should the driver elect to leave the switch in the RS/INT position.

During the wipe, cam output 22 goes to B+, charging capacitor 126 of intermittent RC network 120. At the conclusion of the wipe, the voltage transition from B+ down to zero volts on cam output 22 is transferred to terminal 127 of capacitor 126, causing a negative pulse at that point. At the conclusion of the wipe, no circuit turns on either driver transistor 112 or relay 110, so the wipers remain in the home position for a dwell period. During the dwell period of preferably about five seconds, terminal 127 of capacitor 126 charges to a positive voltage by way of resistor 124. Note that in this configuration, the rain sensor is disconnected, so current flows freely to the base of driver transistor 112. This turns on drive transistor 112 and relay 110, initiating another wipe cycle. This process repeats indefinitely, thus providing the intermittent wiper function. As noted above, a vehicle may be equipped with the complete rain sensing wiper system, as shown in FIGS. 1 and 2. Optionally, because the switch and motor are in common with the intermittent system, the automobile dealer may install the rain sensor 60 and cable 52. For the rain sensing system, the manual off, slow, fast, and mist control settings function just as with the intermittent system described above.

When the operator switches switch 102 to rain sensor mode (RS/INT), monostable circuit 140 provides a single wipe, as described above in intermittent operation. This is the case regardless of whether or not the sensor 60 has sensed the presence of water on the windshield, because the operator would likely not be operating the switch unless the windshield needed to be cleared. If there should happen to be water on the windshield, the effect of the wipers themselves will tend to trigger the rain sensor 60, properly affecting a rapid response within the sensor 60.

During the wipe, the intermittent circuit of the wiper switch charges capacitor 126, just as before. However, output resistor 62 within rain sensor 60 is of a low resistance value— nominally ≧1K ohm. Such low resistance dominates the relatively high resistance of the intermittent RC network 120, shunting any current flowing through resistor 62 to the voltage level established by a microprocessor 74 within sensor 60. Lower resistances yet may be selected, but this would tend to require higher drive capability on the output circuitry of microprocessor 74. Thus, the intermittent RC network 120 cannot turn on wiper relay 110, and the intermittent function is defeated. Both sensor output resistance 62 and intermittent RC network 120 may be scaled up or down, but for the sensor to properly dominate the circuit when the sensor is connected, resistor 122 should be at least ten times the value of resistor 62. When no water is present on the windshield, the nominal voltage from the rain sensor 60 is zero, and the wipers remain in the home position.

Figure 3:
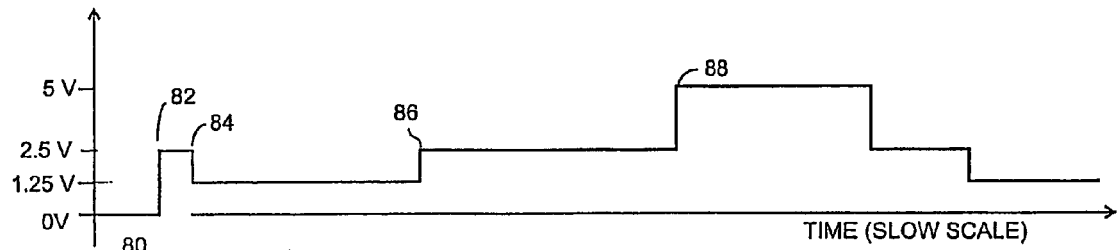
FIG. 3 presents a graph of the rain sensor voltage output against a slow (on the order of seconds) time scale.

FIG. 3 shows the output voltage of the rain sensor 60 with changing water conditions. The rain sensor 60 commands the state of the wipers by assuming a control voltage, as per the following table:

TABLE

| Function | Voltage |
| --- | --- |
| Off | 0 |
| Lights | 1.25 V |
| Slow | 2.5 V |
| Fast | 5 V |

The voltages in the Table are determined by setting the outputs of hi (5V), low (0V) or tristate (open), connected to the divider network formed by resistors 64, 66, and 68. At the beginning of the graph of FIG. 3, at time 80, the rain sensor is commanding off. At a time 82, sensor output S assumes 2.5V for 1 sec, thereby commanding a single wipe. It takes nominally 1.4 seconds for the wipers to actually complete a wipe cycle. Upon completion of the wiper command at time 84, the rain sensor may command an optional light function. In an alternative embodiment further described later herein, the rain sensor is capable of activating vehicle headlamps. Continuing in FIG. 3, at time 86 the rain sensor commands steady slow, this time lasting for nominally 6 seconds, or 4 complete wipes. At time 88, a higher flow of rainfall has justified entry into steady fast or high speed, and the sensor output commands this by assuming 5V. The sensor output subsequently decelerates through slow, and back into a dwell period with the lights on.

Returning to FIG. 2, electrical input analysis device, also known as driver transistor 112, is held off when the off command is given by the rain sensor 60. As explained earlier, because the sensor has a low resistance output, this is irrespective of the state of the high resistance intermittent network 120. At time 86, when the rain sensor output crosses a threshold of nominally 1.8 V as set by resistors 116 and 118, driver transistor 112 turns on, initiating a single wipe in a fashion similar to intermittent operation described earlier. Similarly, the preferred embodiment does not respond differently to a fast command. At time 88 (referring to FIG. 3), it simply continues operation of the wiper at a slow speed.

It may be readily seen that the only components needed to effect rain sensor 60 operation over those required for intermittent operation, are the sensor 60 and cable 52, as well as sensor connector 114, and a single resistor 116. Thus, the cost penalty for an intermittent system that can be upgraded to rain sensor operation is just connector 114 and resistor 116, representing a negligible additional cost.

The embodiment of the invention thus far described provides a windshield wiper control system that may operate as an intermittent system or a rain sensing system with little increase in cost. The vehicle manufacturer may choose to implement the additional features of fast speed wiper control, as well as automatic headlamp control, retaining the same general shape of control unit assembly 100 shown in FIG. 1, and using the same mounting arrangement. This allows the vehicle manufacturer to provide a full range of vehicle option levels, wherein the least expensive vehicles suffer no cost penalty over more expensive vehicles. It may be noted that for the lowest possible cost system the switch may also be offered even without intermittent control in control unit assembly 100.

Figure 4:
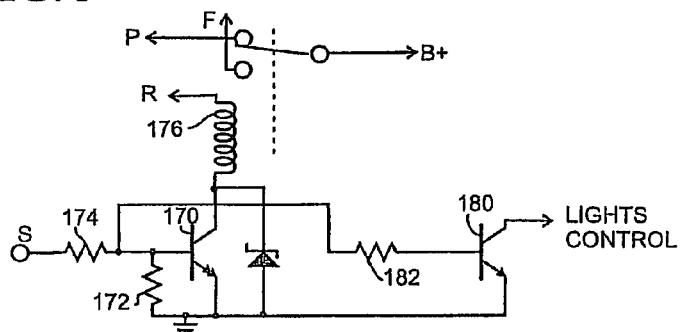
FIG. 4 is a schematic diagram of a high speed wiper control and automatic headlamp control which are within the scope of certain embodiments of the invention.

The windshield wiper control system of the invention may optionally be upgraded to control the wipers at high speed by adding the circuit as shown in FIG. 4. The circuit is added to the schematic diagram of FIG. 2 by connecting the sensor output S as shown, as well as connecting the normally open connection P of slow relay 110, rather than directly to B+. FIG. 4 shows a transistor 170 disposed to turn on when sensor output S reaches a nominal threshold of 3.25V. This in turn engages a fast relay 176, which withdraws power (B+) from the slow relay connection P, and applies power to the fast winding 26. This causes wiper motor 12 to spin at high speed. As the system is shown, slow speed winding 24 is disconnected when fast winding 26 is engaged. Power for fast relay 176 is supplied by conductor R. Thus configured, when the sensor commands fast speed at time 88, the wipers run fast.

The alternative embodiment also includes a transistor 180 to turn on the lights when sensor output S exceeds 0.7 V. The collector 184 of transistor 180 drives a relay (not shown) operatively connected to the vehicle's headlamps through the connection labeled LIGHTS CONTROL. Thus disposed, the vehicle headlamps properly turn on when the rain sensor senses darkness, or initiates wiping. A switch may be connected in series with conductor LIGHTS CONTROL to disable automatic operation.

Figure 5:
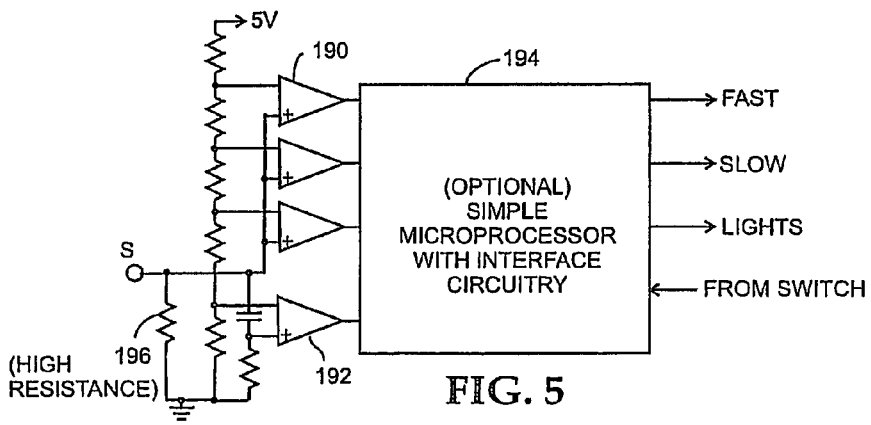
FIG. 5 shows an alternative embodiment of the invention using comparators connected to a divider array to analyze the control voltage signal from the rain sensor.

Transistors are preferred for implementing the thresholds as required to respond to the voltage commands of the Table. The threshold response analysis may alternately be implemented using comparators 190, such as the LM339 by National Semiconductor. This is shown at FIG. 5, replacing the control circuit generally of FIG. 2. Although not a preferred configuration, a simple microprocessor 194 may be included to accomplish the very simple timing functions of the monostable circuit 140 as well as the intermittent circuit 120. It must be stressed that the computational requirements of the microprocessor are extremely modest; an inexpensive four-bit processor, is well up to the task. This is still within the design intent of the invention, requiring nowhere near the processing power required to implement a CAN or LIN mode. Microprocessor 194 need not analyze any digital data from the rain sensor. Optionally, a comparator section may be configured as a pulse-detector 192 to discriminate superimposed data, as described below. This embodiment thus includes a high resistance resistor 196 to pull the sensor output S to ground in the absence of a sensor 60. Alternatively, the sensor outputs may be connected to an RC intermittent network, such as network 120 of FIG. 2.

Figure 6:
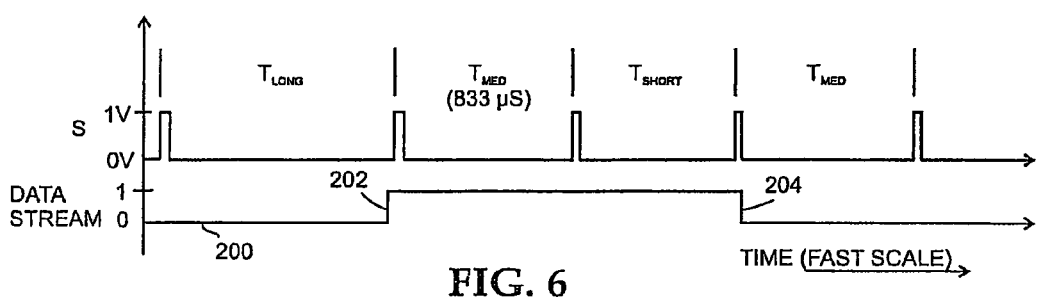
FIG. 6 presents a graph of the rain sensor output voltage of the invention compared to fast (order of microseconds) time scale, showing how a pulsatile data signal may be superimposed upon the control voltage signal from the rain sensor.

The rain sensor 60 of the preferred embodiment, in order to affect the basic commands required of the rain sensing system, uses a simple control voltage scheme, rather than data transfer as such. This permits the interface portion, incorporated into the switch 102 in this embodiment, to respond to the switch 102 with no need for computation. The sensor 60 preferably, however, superimposes data transfer upon the control voltage output S, in a way that does not impede operation of the invention described herein. In addition to the relatively slow (seconds time scale) control voltage outputs, the sensor 60 produces fast, short pulses. These pulses last nominally 30 microseconds, and are nominally 833 microseconds apart. This permits data transfer at a slow 1200 baud. FIG. 6 shows a serial communications data stream 200, internal to rain sensor 60, as well as sensor output S. Data stream 200 represents a bit, within a register of sensor microprocessor 74. The relays of the system (110, 176) respond much too slowly to be affected by the superimposed data. The 833 microsecond period is lengthened by nominally 60 microseconds for positive data transitions 202, and shortened by 60 microseconds for negative data transitions 204. Over time, positive and negative data transitions cancel. The graph shown at FIG. 6 shows the rain sensor 60 commanding an off state of the wiper. For other states, such as slow, the pulses are superimposed upon the larger, slower voltages shown in FIG. 3. This scheme may be used for testing the rain sensor 60 during its manufacture. The scheme may also be used to test the simple existence of a sensor 60 using pulse detector 192 without fully decoding the data. This again allows for an extremely simple processor.

Although the description above contains many specificities, these should not be construed as limiting the scope of the invention, but as merely providing some of the presently preferred embodiments of the invention. For example, each of the above descriptions show the wiper motor with a common ground terminal, and engaged by applying a positive voltage. Almost as common in the auto industry is ground-side switching, wherein the common terminal of the motor is connected to B+, and slow and fast windings are grounded to affect motor operation. The invention may be readily modified to accommodate ground side switching. Also, the switch assembly may be dash-mounted rather than deployed with a steering column stalk control. Thus, the scope of the invention should be determined by the appended claims and their legal equivalents, rather than by the examples given.

What is claimed is:

1. A windshield wiper control system comprising:
a disconnectable rain sensor including an output capable of producing varying voltage levels, such voltage levels corresponding to a selected mode of windshield wiper operation, the control voltage outputs having an associated rain sensor output electrical resistance;
a wiper driver motor with an integrated cam assembly;
a wiring harness operatively connected to the wiper driver motor;
an operator accessible windshield wiper control unit, contained in a stalk connected to the vehicle steering column and connected to the wiring harness, the windshield wiper control unit containing a control circuit comprising:
(a) at least one mechanical switch having a plurality of electrical contacts;
(b) a rain sensor control electrical input operatively connected to the rain sensor control voltage output;
(c) an intermittent RC network operatively connected to the rain sensor control electrical input and configured to provide an intermittent delay function, and comprised of a capacitor and at least one intermittent RC network resistor, said intermittent RC network resistor being of a value at least ten times the value of the rain sensor output resistance;
(d) at least one electrical relay operatively connected to drive the wiper driver motor;
(f) a rain sensor electrical input analysis device which responds to the varying control voltages present at the rain sensor control voltage inputs, the varying control voltages driving the at least one electrical relay; wherein the rain sensor output resistance shunts current flowing through the intermittent RC network resistor and the windshield wiper control system operates in a rain sensing mode, but when the rain sensor control voltage output is disconnected from the rain sensor control electrical input, the windshield wiper control system operates in a conventional intermittent wiper operation mode.

2. The windshield wiper control assembly defined in claim 1, wherein a particular rain sensor output voltage level activates the headlamps of the vehicle in which the rain sensor is installed.

3. The windshield wiper control system defined in claim 1, wherein when the at least one mechanical switch comprises an off position, and when the switch is moved from the off to intermittent position, a monostable circuit provides an electrical pulse about 1 second in length, activating the wiper driver motor.

\* \* \* \* \*